Patented Jan. 27, 1948

2,435,147

UNITED STATES PATENT OFFICE 2,435,147

ORGANO-SILICON POLYMERS AND METHODS OF PREPARING THEM

Rob Roy McGregor, Verona, and Earl Leathen Warrick, Pittsburgh, Pa., assignors to Corning Glass Works, Corning, N. Y., a corporation of New York No Drawing. Application March 30, 1943, Serial No. 481,142

6 Claims. (Cl. 260—46.5)

This invention relates to new compositions of matter, their preparation and uses and, more particularly, to organo-silicon polymers and methods of preparing them.

This application is a continuation-in-part of our copending application Serial Number 460,830, filed October 5, 1942.

The present invention is concerned with a method of further polymerizing organo-silicon oxid polymers and with the products derived therefrom. Organo-silicon oxide polymers are compounds which contain organic radicals attached to silicon through a carbon atom and whose silicon atoms are joined to other silicon atoms by oxygen atoms, thus Si—O—Si. They may be prepared by the hydrolysis of hydrolyzable organo-silicanes and condensation of the hydrolysis products. Furthermore, hydrolysis of a mixture of different hydrolyzable organo-silicanes and co-condensation of the hydrolysis products produces organo-silicon oxide copolymers which are within the scope of our invention. In the latter case, a hydrolyzable silicane which contains no organic radicals attached to silicon through a carbon atom, such as silicon tetrachloride or ethyl orthosilicate, may be included along with the hydrolyzable organo-silicanes. By hydrolyzable organo-silicanes we mean derivatives of $SiH_4$ which contain readily hydrolyzable radicals such as hydrogen, halogens, amino groups, alkoxy, aroxy and acyloxy radicals, etc., the remaining valences of the silicon atoms being satisfied by organic radicals that are joined to the silicon atoms through carbon atoms such as alkyl, substituted alkyl, aryl, substituted aryl radicals, etc.

Hydrolysis of the above silicanes or mixtures thereof is generally concurrently accompanied by condensation to a greater or less degree depending upon the conditions of hydrolysis and the particular silicanes involved. As a result of the hydrolysis and concurrent condensation, organo-silicon oxide polymers or organo-siloxanes (as they are now commonly called) are produced which are partially or completely condensed and which have on the average up to and including three organic radicals attached to each silicon atom. The polymers so obtained vary in character, some being oily liquids, others being crystalline solids or gels. They also vary in the ease with which they may be further polymerized by heat since they differ in the number of active functional groups retained as a result of incomplete hydrolysis and condensation. Those which are only partially condensed may be converted to higher polymers and even to solids by heat alone or even by standing at room temperature by virtue of the completion of condensation. On the other hand, those organo-siloxanes which approach complete condensation are extremely resistant to further polymerization by heat alone. These substantially completely condensed polymers are not limited to those which are of high molecular weight but may be polymers of low molecular weight as well. For example, the condensed hydrolysis products of the di-organo-silicanes are essentially completely condensed even in the low polymeric stages and exist generally as liquids in the trimeric form with polymers as high as the hexamer being reported in only rare instances. Since the higher polymers of these organo-silicon oxide compounds, and particularly the higher polymers of the substantially completely condensed compounds, have been found to possess properties which adapt them to many industrial applications as will be described below, it is highly desirable to provide a method of further polymerizing the organo-silicon oxide polymers to higher polymeric compositions, that is, to increase their average molecular weight.

The primary object of this invention is to provide a method of polymerizing the hydrolysis products of hydrolyzable organo-silicanes or mixtures thereof.

Another object of our invention is to provide a method of further polymerizing an organo-siloxane having on the average less than three organic radicals attached through carbon atoms to each silicon atom.

Another object of our invention is to provide a method of further polymerizing a substantially completely condensed liquid hydrolysis product of a silicane of the type $R_2SiX_2$, where each R is an organic radical which is joined to the silicon atom through a carbon atom and each X is a hydrolyzable atom or group.

Still another object of the present invention is to provide a method of polymerizing a substantially completely condensed liquid hydrolysis product of a mixture comprising essentially a di-organo-substituted silicane to a polymeric composition which is substantially free of polymers having less than seven silicon atoms per molecule.

Another object of our invention is to provide a method of polymerizing to a heat convertible state a liquid organo-siloxane having on the average less than three organic radicals attached through carbon atoms to each silicon atom.

A further object of our invention is to provide a method of polymerizing to an infusible resinous solid a liquid organo-siloxane having on the average less than three organic radicals attached through carbon atoms to each silicon atom.

Another object of our invention is to prepare organo-siloxanes of high average molecular weight which are heat convertible and soluble in organic solvents.

A still further object of our invention is to prepare organo-siloxanes of high average molecular weight which are tack-free resins.

In accordance with our invention, we have provided a method of preparing an extremely useful and polymeric composition from the hydrolysis product of a hydrolyzable organo-silicane or of a mixture of hydrolyzable organo-silicanes which comprises maintaining phosphorus pentoxide or phosphoric acid in intimate and continuous contact with the hydrolysis product under polymerizing conditions until a polymeric composition having the properties desired is obtained. If desired, the phosphorus pentoxide or the phosphoric acid may be added during the initial hydrolysis and condensation of the silicane or mixture of silicanes. It is important in the case of the liquid hydrolysis products which are substantially completely condensed, that the catalyst be maintained in intimate and continuous contact with the siloxane until the desired higher polymer is obtained; for we have found that an appreciable increase in average molecular weight does not occur until the polymer has been treated for some time. After this induction period, the viscosity and average molecular weight of the treated material rises rapidly until a stage of polymerization is reached where the catalyst is no longer necessary to promote further polymerization but heat alone in the presence of air is sufficient to convert the polymerized silicone to a tack-free resinous solid. Those organo-siloxanes which are initially only partially condensed do polymerize by heat alone but we have found that treatment in accordance with our invention not only increases the rate of polymerization but in many instances produces flexible resinous solids instead of the mechanically weak gels ordinarily obtained by heat alone. In carrying out the polymerization, we have found that the addition of water, preferably in the form of steam, aids in speeding up the polymerization. The particular concentration and quantity of acid employed and the optimum temperature for carrying out the polymerization are conditions which vary with the siloxane being treated and also with the type of polymer desired as will be readily apparent from the examples given below. In general, we prefer to employ phosphoric acid having a concentration of about 85% and to carry out the polymerization at a temperature within the range of from about 100° C. to about 250° C.

In general, any liquid organo-siloxane having on the average less than three organic radicals attached through carbon atoms to each silicon atom may be polymerized by our method; that is, treatment in accordance with our method will result in an increase in average molecular weight. Our method is not generally applicable to those siloxanes having three organic radicals attached to each silicon atom, namely, the dimeric ethers, since the only way the latter can further polymerize is by removal of groups. It is to be understood, however, that treatment by our method may result in loss of some groups but it is believed that polymerization is primarily due to rearrangement of the Si—O—Si bonds. By our method, liquids of extremely high molecular weight and viscosity may be obtained which are soluble in organic solvents such as toluene and acetone. If desired, the polymerization may be carried to the point where the product is still soluble but is heat convertible; that is, it can be converted by heat alone to a tack-free resinous solid which is not soluble in most organic solvents.

The polymerization of organo-siloxanes by phosphorus pentoxide or phosphoric acid is probably accomplished by a combination of dehydration of hydroxyl groups and by rearrangement of Si—O—Si groups. Phosphorus pentoxide and phosphoric acid are effective dehydrating agents and probably promote condensation of the hydrolyzed silicanes wherever active hydroxyl groups exist. In addition, they catalyze the rearrangement of the extremely stable Si—O—S groups so that larger molecules are formed even when the siloxane is substantially free of active functional groups. In any event, we have found that phosphorus pentoxide and phosphoric acid are in general greatly superior to other polymerization catalysts both as to their effect upon the speed of polymerization and upon the properties of the resulting products.

Reference should be had to the following examples for a better understanding of our invention.

*Example 1*

A sample of trimeric phenyl ethyl silicone was heated to about 180° C. and 1.5% of its weight of 85% phosphoric acid was added with stirring. The mixture was kept at 180°–190° C. until the viscosity of a 50% solution of the product in toluene at 25° C. reached 50 centipoises. The phosphoric acid was removed by washing with excess calcium hydroxide, leaving a toluene solution which served as an excellent coating composition for glass fibre tape, the toluene evaporating upon the application of heat and depositing a phenyl ethyl silicone coating that became infusible and adherent upon further heating in the neighborhood of 200° C. to 250° C. and remained tough and flexible after many hours at these temperatures.

*Example 2*

A sample of butyltriethoxysilicane was hydrolyzed in the presence of nitric acid. The nitric acid was removed by washing from the hydrolyzed product. Phosphoric anhydride was added to a portion of the product. The mixture was then heated for 24 hours at about 160° C. An extremely viscous liquid was produced whose molecular weight was found to be 1650.

*Example 3*

A sample of dimethyldiethoxysilicane was refluxed for 30 minutes with hydrochloric acid and water. The resulting alcohol and water were washed out leaving an oily liquid which had a viscosity of 13.4 Saybolt seconds. It was then held over night at 100 mm. pressure and at 120° C. Its viscosity was then 19.2 seconds. Heating under vacuum was continued for a total of 46 hours. The liquid at that point had a viscosity of 23.1 seconds. Phosphorus pentoxide was then added. After two and one-half hours with heat and under vacuum, the viscosity of the fluid was 67.3 seconds. Further heating under vacuum for another 24 hours produced a material having only slight flow at room temperature.

Example 4

A sample of dibutyldiethoxysilicane was treated in the same manner as the dimethyldiethoxysilicane in Example 3. Before the addition of phosphorus pentoxide the hydrolyzed product had a viscosity of 46.8 Saybolt seconds. At the end of the two and one-half hours of heating in the presence of phosphorus pentoxide its viscosity was 422 Saybolt seconds which increased to 1120 Saybolt seconds after further heating for 24 hours. Another sample of dibutyldiethoxysilicane was hydrolyzed with alcohol and hydrochloric acid to an oily liquid. This liquid was held at 100° C. for 13 hours. Its viscosity was then determined to be 276 Saybolt seconds as compared with the 1120 Saybolt seconds of the oil treated wtih phosphorus pentoxide.

Example 5

A sample of phenyl methyldiethoxysilicane was mixed with twice its volume of 85% phosphoric acid. The mixture was heated at 75° C. for two hours. The product which was an extremely viscous liquid was washed free of acid and dissolved in acetone. The solution was applied to glass fibre tape and heated at 200° C. An adherent coating was formed on the tape which was flexible and tough even after 16 hours at 250° C.

Example 6

To dimethyldiethoxysilicane was added 5% sulphuric acid in an amount sufficient to give a slight excess of the theoretical water required for hydrolysis. Acid and alcohol were washed out with water. The resultant oil had a viscosity of 6 centistokes at 30° C. A portion of this was then treated with 15% of its volume of 85% phosphoric acid and was heated to 125° C. for one hour with stirring. Forty-eight hours later this oil was washed with water, dilute ammonia, and then again with water; residual water was driven off with heat. The viscosity of the final liquid was 1730 centistokes at 30° C.

Example 7

A mixture was prepared consisting of 70 mol per cent monomethyltriethoxysilicane and 30 mol per cent trimethylmonoethoxysilicane. This was dropped into half its volume of 2 N hydrochloric acid while the temperature was held at 0° C. The mixture was stirred during this addition. The mixture was then refluxed for 24 hours. It was then thrown into a large volume of water and washed free of acid. It was then taken up in benzene and refluxed with a water trap attached to the condenser. When no more water could be eliminated a sample was removed and heated to 175° C. for 30 hours. The sample remained liquid. To the remainder of the benzene solution there was added about 0.2% (based on the silicone content) of 85% phosphoric acid. Upon resuming the refluxing about 2% (based on solids) of water was eliminated within two hours. A sample of this material set to a resinous solid in two hours at 150° C.

Example 8

A mixture of ethyl silicon trichloride, phenyl ethyl silicon dichloride and diphenyl ethyl silicon monochloride in the molar ratio of 1-8-2 respectively was dissolved in ether and hydrolyzed by mixing with water. The ether solution of the resulting copolymer was washed free of hydrochloric acid, and the ether removed by distillation. The resulting ether free copolymer was then polymerized with .2% by weight of 85% $H_3PO_4$ while blowing with steam. After 30 hours, the product was a resinous tacky material, soluble in toluene and having a viscosity in 50% solution of 420 centistokes at 25° C. Applied from a toluene solution to glass fibre tape it dried (after removal of solvent) in 3 hours of baking at 250° C. to a heat resistant, tack-free resin.

Example 9

A mixture of ethyl silicon trichloride, phenyl silicon trichloride, phenyl ethyl silicon dichloride, diphenyl silicon dichloride, diethyl silicon dichloride and diphenyl ethyl silicon monochloride (prepared by reaction of silicon tetrachloride, phenyl magnesium chloride and ethyl magnesium chloride in molar ratio of 1-1-1 at $-20°$ C.) was dissolved in ether and hydrolyzed with water. The ether solution was washed free of acid and the ether removed by distillation. The resulting copolymer material was polymerized to a viscous, tacky material by heating at 220° C. with .2% by weight of 85% $H_3PO_4$ while blowing with steam. The material was soluble in toluene and when applied from a toluene solution to glass fibre tape it dried (after removal of solvent) within a few hours of baking at 250° C. to a heat resistant tack-free resin.

In addition to the examples given above, the condensed hydrolysis products of diethyl silicon dichloride, diamyldiethoxysilicane, dibenzyldiethoxysilicane, ethyltriethoxysilicane and amyltriethoxysilicane may be polymerized by our method. Besides these straight mono- and di-organo-substituted hydrolysis products, numerous copolymers containing on the average of from less than one up to but not including three radicals per silicon atom have been polymerized in accordance with this invention. These copolymers were prepared by the cohydrolysis and co-condensation of mixtures of differently substituted hydrolyzable silicanes obtained directly as mixtures from the Grignard reaction of an organ-magnesium halide on silicon tetrachloride or ethyl orthosilicate or prepared by mixing different silicanes of fair degree of purity to give mixtures of desired constituents in predetermined quantities. Among the silicanes employed to accomplish the latter were silicon tetrachloride, ethyl orthosilicate, methyltriethoxysilicane, dimethyldiethoxysilicane, trimethylethoxysilicane, phenylmethyldiethoxysilicane, phenyldimethylethoxysilicane, phenyltriethoxysilicane, diphenyldiethoxysilicane, ethyltriethoxysilicane, diethyl silicon dichloride, phenyl ethyl silicon dichloride, butyltriethoxysilicane, dibutyldiethoxysilicane, benzyltriethoxysilicane, dibenzyldiethoxysilicane and others.

Our invention is applicable to any organo-silicon oxide polymer having on the average less than three organic radicals attached to each silicon atom through carbon atoms. The unusual properties of these polymers are due primarily to the Si—O—Si groups present therein and to the organic radicals attached to the silicon atoms. The kind and number of organic radicals attached to silicon do not affect the fundamental behavior of the polymers, but only modify certain particular properties thereof. Besides the organic radicals already disclosed such radicals may be present as propyl, isopropyl, amyl, hexyl, heptyl to octadecyl and higher; alicyclic radicals such as cyclopentyl, cyclohexyl, etc.; aryl and alkaryl radicals such as mono- and poly-alkyl phenyls as tolyl, xylyl, mesityl, mono-, di-, and tri-ethyl phenyls, mono-, di-, and tri-propyl phenyls, etc.; naphthyl, mono- and poly-alkyl naphthyls as methyl naphthyl, diethyl naphthyls, tri-propyl naphthyl, etc.; tetrahydro-naphthyl, anthracyl, etc.; aralkyl such as benzyl, phenylethyl, etc.; alkenyl such as methallyl, allyl, etc.

The new polymers may be used for various purposes. For example, they are excellent coatings for metallic conductors and excellent impregnating agents, particularly in the fabrication of electrical insulating materials, because in their intermediate form they can be dissolved and applied in the form of solutions for the impregnation of various fibrous materials and thereafter can be polymerized to complete insolubility and infusibility. In the latter state they have good mechanical characteristics and good electrical properties at room temperature, all of which are retained at temperatures above those at which prior coating materials break down and deteriorate. The new polymers are relatively non-flammable and are likewise superior to prior coatings in that under extreme conditions of temperature, etc. there is little tendency to carbonize.

In making use of the new polymers for impregnating tapes and other fibrous materials for electrical insulation the polymerization is carried out until the material has attained the sticky, viscous heat-convertible state just short of insolubility. Then, if desired, the acid may be removed by neutralization with alkali such as sodium hydroxide or calcium hydroxide. The alkali, when added in excess, also serves to remove impurities that may be present such as iron, etc. The neutralized product is dissolved in toluene or other suitable solvent. The solution is applied by dipping, brushing or spraying, followed by evaporation of the solvent. Several applications of the solution may be required to produce a coating of sufficient thickness. When the solvent has completely evaporated, the coated article is baked for several hours at a temperature preferably between 200° C. and 300° C. until the viscous polymeric mixture is converted to a tack-free coating. With the phenyl ethyl silicone polymers, this condition is attained by baking for about 36 hours while the temperature is slowly raised from about 200° C. to about 260° C. Other organo-silicon polymers within the scope of our invention may require different temperatures and times, but such conditions are readily determined by trial.

In addition to the use of the new polymers in the field of electrical insulation, there are many others for which these polymers at various stages of polymerization are eminently adapted particularly in those stages prior to heat convertibility. In these thermally stable stages, they may be used as hydraulic fluids, liquid insulating media, thermal expansion fluids, water-proofing agents, etc. Their resistance to high temperature, their electrical insulating properties, low freezing points and low vapor pressure adapt them to many diversified industrial applications.

We claim:

1. The method of polymerizing substantially completely dehydrated liquid polymers consisting of a polymeric diorgano siloxane in which one of the two organic radicals attached to each silicon atom is an alkyl radical, and the other organic radical is selected from the class consisting of alkyl and aryl radicals, which comprises adding to said polymers an agent selected from the class consisting of phosphorous pentoxide and phosphoric acid, and maintaining said agent in reactive relationship with said polymers at a temperature below 250° C. until an increase in viscosity is effected.

2. The method of polymerizing substantially completely dehydrated liquid polymers consisting of a polymeric diorgano siloxane in which one of the two organic radicals attached to each silicon atom is an alkyl radical, and the other organic radical is selected from the class consisting of alkyl and aryl radicals, which comprises adding to said polymers an agent selected from the class consisting of phosphorous pentoxide and phosphoric acid, and maintaining said agent in reactive relationship with said polymers at a temperature between 100° C. and 250° C. until an increase in viscosity is effected.

3. The method of polymerizing substantially completely dehydrated liquid polymers consisting of a polymeric dimethyl siloxane which comprises adding to said polymers an agent selected from the class consisting of phosphorous pentoxide and phosphoric acid, and maintaining said agent in reactive relationship with said polymers at a temperature below 250° C. until an increase in viscosity is effected.

4. The method of polymerizing substantially completely dehydrated liquid polymers consisting of a polymeric dimethyl siloxane which comprises adding to said polymers an agent selected from the class consisting of phosphorous pentoxide and phosphoric acid, and maintaining said agent in reactive relationship with said polymers at a temperature between 100° C. and 250° C. until an increase in viscosity is effected.

5. The method of polymerizing substantially completely dehydrated liquid polymers consisting of a polymeric dimethyl siloxane which comprises adding to said polymers an agent selected from the class consisting of phosphorous pentoxide and phosphoric acid, and maintaining said agent in reactive relationship with said polymers at a temperature between 100° C. and 250° C. until a liquid having little flow at room temperature is obtained.

6. The method of polymerizing substantially completely dehydrated liquid polymers consisting of a polymeric dimethyl siloxane which comprises adding to said polymers 85% phosphoric acid, and maintaining said agent in reactive relationship with said polymers at a temperature between 100° C. and 250° C. until a liquid having little flow at room temperature is obtained.

ROB ROY McGREGOR.
EARL LEATHEN WARRICK.

REFERENCES CITED

The following references are of record in the file of this patent:

UNITED STATES PATENTS

| Number | Name | Date |
|---|---|---|
| 2,371,068 | Rochow | Mar. 6, 1945 |
| 2,258,220 | Rochow | Oct. 7, 1941 |

FOREIGN PATENTS

| Number | Country | Date |
|---|---|---|
| 113,708 | Australia | Sept. 4, 1941 |

OTHER REFERENCES

Beilstein, Handbuch der Organ Chem., vol. 4, page 627, 4th ed. (1922).

Ellis, The Chemistry of Synthetic Resins, vol. I, 1935 (Reinhold), page 544.

Robison et al., Tr. J. Chem. Soc., London, vol. 105, 1914, pages 40 to 43.

Certificate of Correction

Patent No. 2,435,147. January 27, 1948.

ROB ROY McGREGOR ET AL.

It is hereby certified that errors appear in the printed specification of the above numbered patent requiring correction as follows: Column 4, line 20, for "Si–O–S" read *Si–O–Si*; Column 6, line 44, for "organ-magnesium" read *organo-magnesium*; and that the said Letters Patent should be read with these corrections therein that the same may conform to the record of the case in the Patent Office.

Signed and sealed this 20th day of April, A. D. 1948.

[SEAL]

THOMAS F. MURPHY,
*Assistant Commissioner of Patents.*